United States Patent [19]

St. Clair

[11] 4,096,203

[45] Jun. 20, 1978

[54] PROCESS TO CONTROL COHESIVE STRENGTH OF BLOCK COPOLYMER COMPOSITION

[75] Inventor: David J. St. Clair, Houston, Tex.

[73] Assignee: Shell Oil Company, Houston, Tex.

[21] Appl. No.: 710,042

[22] Filed: Jul. 30, 1976

[51] Int. Cl.$^2$ .................... C08L 51/00; C08L 53/00
[52] U.S. Cl. .................. 260/876 B; 156/327; 156/334; 260/33.6 AQ; 260/33.6 UA; 260/45.75 K; 260/45.75 W; 260/45.8 SN; 260/45.95 R; 260/829; 260/879; 260/880 B; 260/888; 260/889; 260/897 A
[58] Field of Search ............. 260/876 B, 33.6 AQ, 260/33.6 UA; 156/327, 334

[56] References Cited

U.S. PATENT DOCUMENTS

| | | | |
|---|---|---|---|
| 3,333,024 | 7/1967 | Haefele et al. | 260/876 B X |
| 3,507,934 | 4/1970 | Minor et al. | 260/876 B |
| 3,595,941 | 7/1971 | Farrar et al. | 260/879 |
| 3,630,980 | 12/1971 | Russell | 260/876 B X |
| 3,736,281 | 5/1973 | Russell | 260/876 B X |
| 3,792,124 | 2/1974 | Davison | 260/876 B |
| 3,810,957 | 5/1974 | Lunk | 260/876 B |
| 3,823,203 | 7/1974 | De La Mare | 260/876 B |
| 3,830,767 | 8/1974 | Condon | 260/876 B X |

Primary Examiner—Thomas DeBenedictis, Sr.
Attorney, Agent, or Firm—Dean F. Vance

[57] ABSTRACT

The cohesive strength of a monoalkenyl arene-diene block copolymer adhesive composition containing as a minimum block copolymer and tackifying resin components is controlled by varying the coupling efficiency of the block copolymer polymerization process.

12 Claims, 4 Drawing Figures

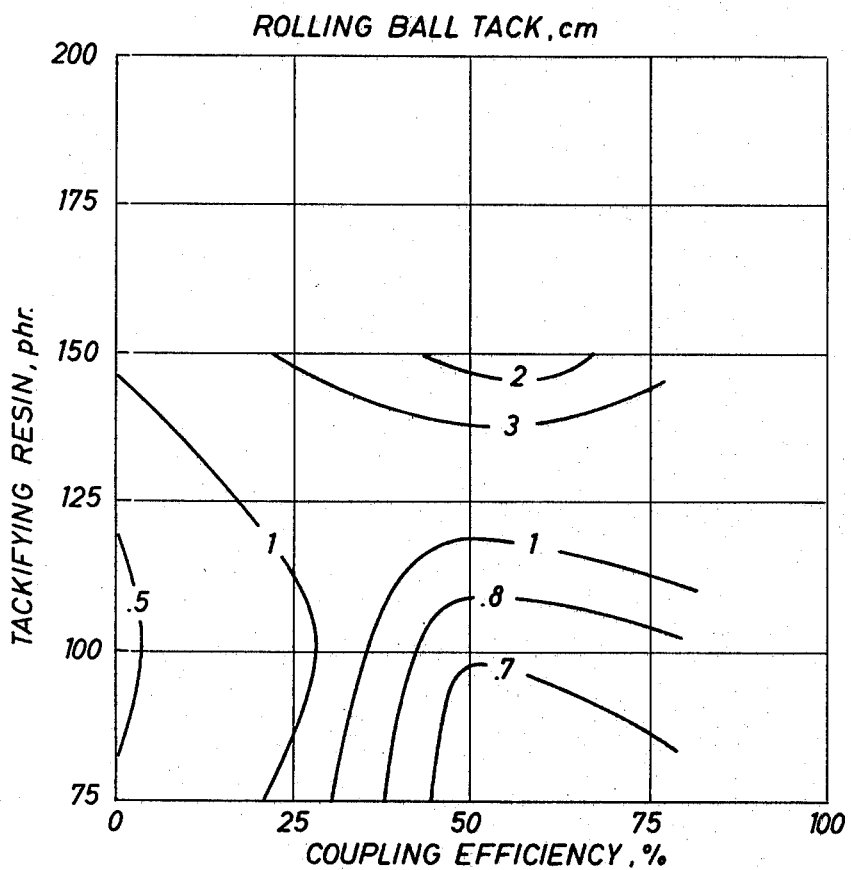
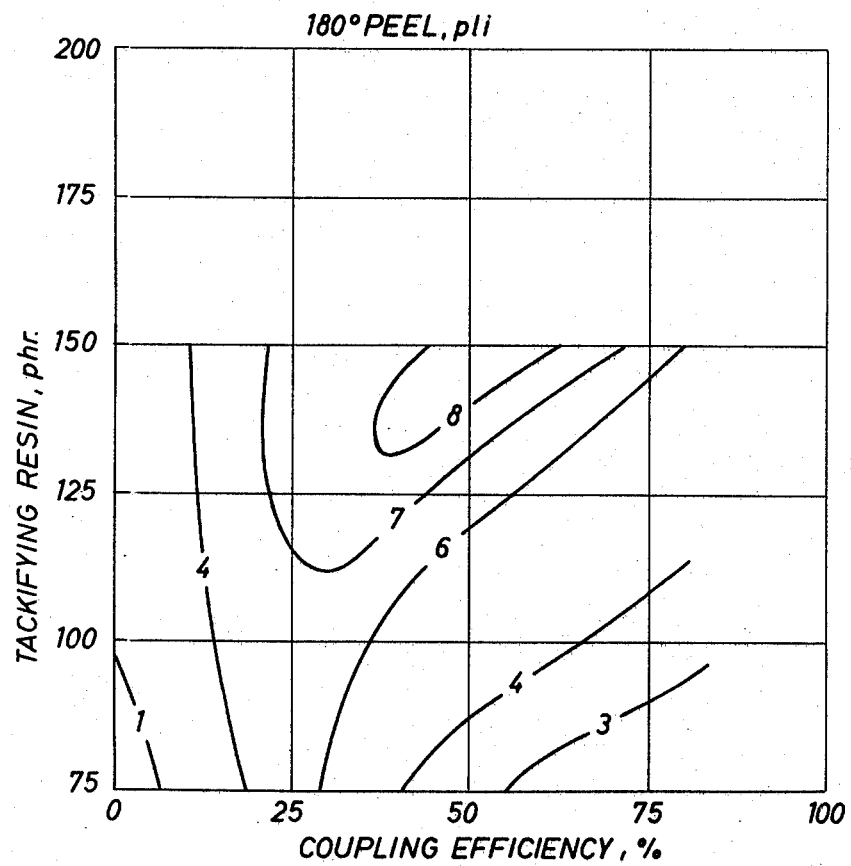

PROCESS TO CONTROL COHESIVE STRENGTH OF BLOCK COPOLYMER COMPOSITION

BACKGROUND OF THE INVENTION

Block copolymers have been increasingly employed in adhesive compositions primarily because of their high cohesive strengths and their ability to "cross-link" without a chemical vulcanization step. These block copolymers, such as those described in Harlan, U.S. Pat. No. 3,239,478, are primarily either linear or radial styrene-butadiene or styrene-isoprene block copolymers. The linear copolymers typically have the structure styrene-butadiene-styrene or styrene-isoprene-styrene. The high cohesive strength of these styrene-diene block copolymers is primarily attributed to their network structure resulting from their well-known domain formation.

However, this very high cohesive strength is often a detrimental quality in certain applications. For example, it is known that in adhesives based on natural rubber or SBR, aggressive tack is inversely related to cohesive strength. That is, as the rubber is crosslinked to a higher degree, the cohesive strength increases but the aggressive tack decreases. Previous patents disclose adhesive compositions containing block copolymers which impart very high cohesive strength to the adhesive. In formulations containing only block copolymer and tackifying resin, aggressive tack is marginal and oil is normally required in the formulation to improve aggressive tack. If some way were found to reduce the cohesive strength of the block copolymer used in an adhesive formulation, substantially improved aggressive tack could be obtained, even in formulations which do not contain oil.

Control of the cohesive strength of an adhesive composition is also important for controlling the peel strength of the adhesive; that is, the force required to remove, for example, a pressure sensitive label from an article on which it has been placed. If some way were found to reduce the cohesive strength of the adhesive composition on the label, the force required to remove the label would be higher because there would exist cohesive failure rather than adhesive failure.

SUMMARY OF THE INVENTION

A novel process has been found for controlling the cohesive strength of a block copolymer adhesive composition which composition comprises as a minimum a block copolymer component and a tackifying resin component, which process comprises:
 (a) reacting an organomonolithium compound with a monoalkenyl arene in the presence of an inert diluent, said organomonolithium compound having the structure RLi where R contains from 2 to 20 carbon atoms per molecule and is an aliphatic radical, cycloaliphatic radical, aromatic radical, or combination thereof;
 (b) reacting the product mixture from step (a) with a conjugated diene having 4 to 5 carbon atoms per molecule; and
 (c) reacting the product mixture from step (b) with a coupling agent in such an amount and under such conditions as to vary the coupling efficiency of the process within the range of about % to about 80%, therein controlling the cohesive strength of the adhesive composition.

Block copolymers made according to the above process when formulated with the typical tackifying resins, extending oils and fillers have an improved aggressive tack and higher peel strength in part due to the cohesive failure of the peel samples. Cohesive failure refers to a failure of the adhesive composition itself resulting in the retention of some of the adhesive gum on the substrate. Cohesive failure is contrasted with adhesive failure, wherein the failure occurs between the adhesive and the substrate resulting in no adhesive gum remaining on the substrate.

This invention is particularly useful in the preparation of block copolymers to be employed as hot melts since the lower coupling efficiency contemplated by the instant invention results in a lower melt viscosity, which makes the adhesive easier to apply at hot melt conditions.

DETAILED DESCRIPTION OF THE INVENTION

BLOCK COPOLYMER POLYMERIZATION PROCESS

Figure 1:
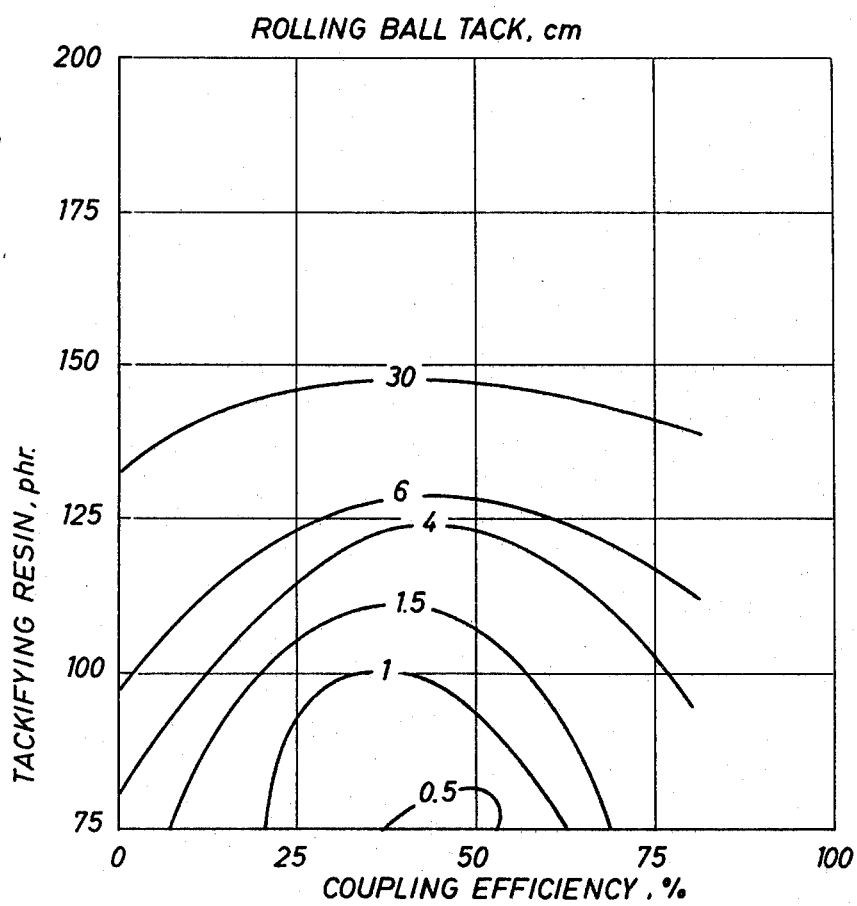

The first step of the process involves contacting the monoalkenyl arene and the organomonolithiun compound (initiator) in the presence of an inert diluent therein forming a living polymer compound having the simplified structure A-Li. The monoalkenyl arene is preferably styrene. Other useful monoalkenyl arenes from which the thermoplastic (non-elastomeric) blocks may be formed include alphamethyl styrene, tertbutyl styrene and other ring alkylated sytrenes as well as mixtures of the same. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-60°$ to $+300°$ F. and at pressures which are sufficient to maintain the reaction mixture in the liquid phase.

Next, the living polymer in solution is contacted with a conjugated diene. Preferred dienes include butadiene and isoprene. A much preferred diene is isoprene. The resulting living polymer has a simplified structure A—B—Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkylthio, arylthio, and tertiary amino groups. Many suitable types of these polyfunctional compounds have been described in U.S. Pat. Nos. 3,595,941; 3,468,972, 3,135,716; 3,078,254; and 3,594,452. When the coupling agent has two reactive sites such as dibromoethane, the polymer will have a linear ABA structure. When the coupling agent has three or more reactive sites, such as silicon tetrachloride, the polymer will have a branched structure, such as $(AB)_nBA$.

In the prior art, such as that exemplified by U.S. Pat. Nos. 3,595,941 and 3,468,972, the effort was always made to select the particular coupling agent or reaction conditions that resulted in the highest coupling efficiency. Coupling efficiency is defined as the number of molecules of coupled polymer divided by the number of molecules of coupled polymer plus the number of molecules of uncoupled polymer. Thus, when producing an SIS linear polymer, the coupling efficiency is shown by the following relationship:

$$\frac{\text{\# of molecules of SIS}}{\text{\# of molecules of SIS plus SI}}$$

Coupling efficiency can be determined theoretically from the stoichiometric quantity of coupling agent required for complete coupling, or coupling efficiency can be determined by an analytical method such as gel permeation chromatography. Typical prior art coupling efficiency is from about 80% to almost 100%. In the present invention coupling efficiency is controlled from about 20% to about 80%, preferably about 30% to about 70%.

It is also within the scope of the present invention to blend polymers from processes of differing coupling efficiency. For example, if a 60% efficiency is desired, then polymers from processes having an 80% efficiency and a 40% efficiency may be blended together.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 190° F, thermal termination of many of the living polymer groups (A—B—Li) occurs prior to coupling.

The typical coupling conditions include a temperature of between about 150° and about 170° F, and sufficient pressure to maintain the reactants in a liquid phase.

Following the coupling reaction or when the desired coupling efficiency has been obtained, the product is neutralized such as by the addition of terminators, e.g. water, alcohol or other reagents, for the purpose of removing the lithium radical forming the nucleus for the condensed polymer product. The product is then recovered such as by coagulation utilizing hot water or steam or both.

ADHESIVE COMPOSITION

The block copolymers produced by the process of this invention will have a simple structure ABA and AB if the coupling agent has only two reactive sites or $(AB)_nBA$ and AB where n is at least three if the coupling agent has three or more reactive sites. The uncoupled polymer has the AB structure. The A block is a monoalkenyl arene and the B block is a conjugated diene. For the purposes of the present invention, the coupling agent residue may be ignored.

The average molecular weights of each of the blocks may be varied as desired. The monoalkenyl arene polymer blocks preferably have average molecular weights between about 5,000 and 125,000, more preferably between about 8,000 and about 40,000. The elastomeric conjugated diene polymer blocks perferably have average molecular weights between about 15,000 and about 250,000, more preferably between about 25,000 and about 175,000. The average molecular weights of the monoalkenyl arene polymer end blocks are determined by gel permeation chromotography, whereas the monoalkenyl arene polymer content of the block copolymer is measured by infrared spectroscopy of the finished block polymer. The weight percentage of the thermoplastic monoalkenyl arene blocks in the finished block polymer should be between about 8 and 55%, preferably about 10% and about 30% by weight. The general type and preparation of these block copolymers are described in U.S. Re. Pat. No. 28,246 and in many other U.S. and foreign patents.

The block copolymer by itself is not sufficiently tacky or sticky. Therefore, it is necessary to add a tackifying resin that is compatible with the elastomeric conjugated diene block. A much preferred tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl butene and about 10% dimer. See South African Pat. No. 700,881. Other tackifying resins of the same general type may be employed in which the resinous copolymer comprises 20–80 weight percent of piperylene and 80–20 weight percent of 2-methyl-2-butene. The resins normally have softening points (ring and ball) between about 80° and about 115° C. Mixtures of resins having high and low softening points may also be used. Other tackifying resins which are also useful in the compositions of this invention include hydrogenated resins, esters of resin, polyterpenes, terpenephenol resins, and polymerized mixed olefins. The amount of tackifying resin employed varies from about 50 to about 200 parts per hundred rubber (phr), preferably, between about 50 and about 150 phr.

The adhesive compositions of the instant invention also may contain plasticizers such as rubber extending or compounding oils. These rubber compounding oils are well-known in the art and include both high saturates content and high aromatic content oils. The amount of rubber compounding oil employed varies from about 10 to about 100 phr (parts by weight per hundred parts by weight rubber), preferably about 20 to about 60 phr.

Optionally, an arene-block-compatible resin may be employed. Compatibility is judged by the method disclosed in U.S. Pat. No. 3,917,607. Normally, the resin should have a softening point above about 100° C, as determined by ASTM method E 28, using a ring and ball apparatus. Mixtures of arene-block-compatible resins having high and low sofening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from about 10 to about 200 phr.

The compositions of this invention may be modified with supplementary materials including pigments, fillers, and the like as well as stabilizers and oxidation inhibitors. Stabilizers and oxidation inhibitors are typically added to the commercially available compounds in order to protect the polymers against degradation during preparation and use of the adhesive composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:

1. Benzothiazoles, such as 2-(dialkyl-hydroxybenzylthio)benzothiazoles.
2. Esters of hydroxybenzyl alcohols, such as benzoates, phthalates, stearates, adipates or acrylates of 3,5-dialkyl-1-hydroxybenzyl alcohols.
3. Stannous phenyl catecholates.
4. Zinc dialkyl dithiocarbanates.
5. Alkyl phenols, e.g., 2,6-di-tert-butyl-4-methyl phenol.
6. Dilaurylthio-dipropionate.

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bis-phenolic phosphite. From about 0.01 percent to about 5.0 percent by weight of one or more antioxidants is generally added to the hot-melt adhesive composition.

The adhesive compositions of the present invention may be prepared by either blending block copolymer, oil and tackifying resin in a solvent, such as toluene, and removing the solvent by a stripping operation or they may be prepared by merely mixing the components at an elevated temperature, e.g. at about 150° C (hot melt). In addition, if desired, the adhesive compositions may be cured, for example, by known irradiation techniques.

A preferred use of the present invention is in the preparation of pressure-sensitive adhesives tapes by a method such as that disclosed in U.S. Pat. No. 3,676,202 or in the manufacture of labels. The pressure-sensitive adhesive tape comprises a flexible backing sheet and a layer of the pressure-sensitive adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

The invention is further illustrated by means of the following illustrative embodiments, which are given for the purposes of illustration only and are not meant to limit the invention to the particular reactants and amounts disclosed.

Various standard tests are employed to measure the adhesive and cohesive characteristics of the adhesive compositions. Among these tests are Rolling Ball Tack, Pressure Sensitive Tape Council (PSTC) method PSTC 6; Polyken Probe Tack, ASTM D-2979; 180° Peel, PSTC 1; Quick Stick to Steel and Kraft Paper, PSTC 5; and Holding Power to Steel and Kraft Paper, PSTC 7.

In all embodiments, the invention is demonstrated by using styrene-isoprene/styrene-isoprene-styrene block polymers prepared at various levels of coupling efficiency — 0%, 25%, 50%, 67.5%, and 80%. The blocks copolymerized were prepared in a cyclohexane solvent employing a sec-butyl lithium initiator and a dibromoethane coupling agent.

ILLUSTRATIVE EMBODIMENT I

In Illustrative Embodiment I various oil-free adhesive formulations were prepared. In all formulations, 100 parts by weight of block copolymer and 2 parts by weight of a stabilizer (butazate) were blended with varying amounts of a tackifying resin (Wingtack 95). The results are presented below in Table 1.

Figure 2:
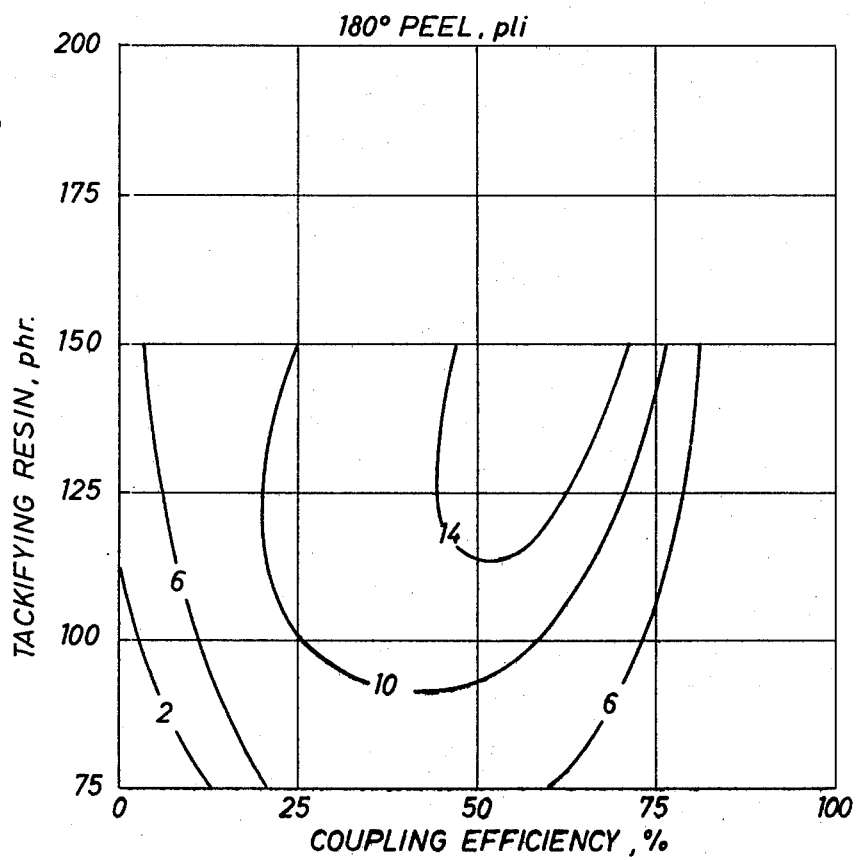

The results showing Rolling Ball Tack and 180° Peel as a function of both coupling efficiency and tackifying resin concentration are graphically shown in FIGS. 1 and 2. From these graphs it is clear that improvements in rolling ball tack and 180° F peel strengths are shown when the coupling efficiency is reduced from 80% to about 50%.

Table I

| Sample No. | LWR | 0 Coupling | | | 25% Coupling | | | 50% Coupling | | | 67.5% Coupling | | | 80% Coupling | |
|---|---|---|---|---|---|---|---|---|---|---|---|---|---|---|---|
| | 172-1E | 172-2E | 172-3E | 172-1A | 172-2A | 172-3A | 172-1B | 172-2B | 172-3B | 172-1C | 172-2C | 172-3C | 172-1D | 172-2D | 172-3D |
| FORMULATION: | | | | | | | | | | | | | | | |
| Block copolymer | 100 | 100 | 100 | 100 | 100 | 100 | 100 | 100 | 100 | 100 | 100 | 100 | 100 | 100 | 100 |
| Butazate Stabilizer | 2 | 2 | 2 | 2 | 2 | 2 | 2 | 2 | 2 | 2 | 2 | 2 | 2 | 2 | 2 |
| Wingtack 95 | 75 | 100 | 150 | 75 | 100 | 150 | 75 | 100 | 150 | 75 | 100 | 150 | 75 | 100 | 150 |
| ADHESIVE PROPERTIES: | | | | | | | | | | | | | | | |
| Rolling Ball Tack, cm | 1.8 | 6.4 | 30+ | .94 | 1.2 | 30+ | .56 | 1.4 | 30+ | 1.5 | 3.9 | 30+ | 3.4 | 3.6 | 30+ |
| Polyken Probe Tack, Kg | .39 | .52 | .52 | 1 | 1.5 | 1.7 | 1.2 | 1.5 | 1.6 | 1.1 | 1.5 | 1.1 | .9 | 1.3 | 1.2 |
| 180° Peel pli | 1.5[1] | 2.6[1] | 5.6[1] | 8.6[1] | 10[1] | 10.4[1] | 6 | 12.8[1] | 14.2[1] | 5.2[1] | 7 | 15[1] | 4.2 | 6 | 5.6[3] |
| Holding Power to Steel, min. | <1 | <1 | 3 | 84 | 168 | 202 | 206 | 229 | 590 | 12.88 | 801 | 219 | 1180 | 1112 | 424 |
| Holding Power to Kraft, min. | <1 | <1 | ≤1 | 55 | 42 | 41 | 661 | 458 | 153 | 12.41 | 568 | 711 | >1500 | >1500 | 847 |
| Quickstick to Steel, pli | 2.3[1] | 4.4[1] | 2[3] | 4.5 | 5.5 | 4[3] | 3.7 | 4.5 | 4[3] | 4.7 | 4.2 | 3.5[3] | 3 | 4 | 3.2[3] |
| Quickstick to Kraft, pli | 1.1 | 1.4[2] | 0.8[2] | 1.1 | 1.3[2] | 0.6[2] | 1.1[2] | 1[2] | 0.8[2] | 0.9 | 0.9 | 0.2[3] | 0.8 | 0.9 | 0.6 |
| PHYSICAL PROPERTIES: | | | | | | | | | | | | | | | |
| Melt vis. @350° C, cps | 26,383 | 16,266 | 5,450 | 57,066 | 26,233 | 7,637 | 116,466 | 48,400 | 20,033 | 142,333 | 93,600 | 36,033 | 261,200 | 128,733 | 33,950 |

[1] Cohesive failure
[2] Split Kraft
[3] Jerky detachment

ILLUSTRATIVE EMBODIMENT II

Illustrative Embodiment II was conducted in a similar manner to Illustrative Embodiment I except that each formulation contained 100 parts by weight block copolymer, 2 parts by weight butazate, 20 parts by weight extending oil (SHELLFLEX ® 371 oil) and 75 to 150 parts by weight Wingtack 95 resin. The results are presented below in Table 2.

FIGS. 3 and 4 show Rolling Ball Tack and 180° Peel as a function of both tackifying resin and coupling efficiency. These graphs reveal that with an oil component, improvements in properties are obtained when the coupling efficiency is reduced to about 67.5%.

Table II

| | | 0 Coupling | | | 25% Coupling | | | 50% Coupling | | | 67.5 Coupling | | | 80% Coupling | | |
|---|---|---|---|---|---|---|---|---|---|---|---|---|---|---|---|---|
| Sample No. | LWR | 172-1E1 | 172-2E2 | 172-3E3 | 172-1A1 | 172-2A2 | 172-3A3 | 172-1B1 | 172-2B2 | 172-3B3 | 172-1C1 | 172-2C2 | 172-3C3 | 172-1D1 | 172-2D2 | 172-2D3 |
| FORMULATION: | | | | | | | | | | | | | | | | |
| Block copolymer | | 100 | 100 | 100 | 100 | 100 | 100 | 100 | 100 | 100 | 100 | 100 | 100 | 100 | 100 | 100 |
| Butazate Stabilizer | | 2 | 2 | 2 | 2 | 2 | 2 | 2 | 2 | 2 | 2 | 2 | 2 | 2 | 2 | 2 |
| Wingtack 95 | | 75 | 100 | 150 | 75 | 100 | 150 | 75 | 100 | 150 | 75 | 100 | 150 | 75 | 100 | 150 |
| SHELLFLEX®371 | | 20 | 20 | 20 | 20 | 20 | 20 | 20 | 20 | 20 | 20 | 20 | 20 | 20 | 20 | 20 |
| ADHESIVE PROPERTIES: | | | | | | | | | | | | | | | | |
| Rolling Ball Tack, cm | | 0.7 | 0.5 | 1 | 1.3 | 0.8 | 3.7 | 0.7 | 0.6 | 2.2 | 0.7 | 0.8 | 2 | 0.7 | 0.8 | 3.1 |
| Polyken Probe Tack, Kg | | 0.5 | 0.4 | 1.2 | 0.76 | .86 | 2.1 | 0.8 | 1 | 1.7 | 0.7 | 1.1 | 1.8 | 0.6 | 1.1 | 1.7 |
| 180° Peel, pli | | 0.9[1] | 1.3[1] | 2.8[1] | 6.1[1] | 6.8[1] | 7.5[1] | 3.3 | 4.8[3] | 8.2[1] | 2.8 | 4.3 | 8.6[2] | 2.6 | 3.4 | 5.8 |
| Holding Power to Steel, min. | | >1 | >1 | >1 | 10 | 17 | 33 | 6 | 40 | 99 | 4 | 29 | 106 | 5 | 24 | 158 |
| Holding Power to Kraft, min. | | >1 | >1 | >1 | <1 | 3 | 6 | 12 | 29 | 44 | 20 | 80 | 88 | 33 | 100 | 120 |
| Quick Stick to Steel, pli | | 1[1] | 1.7[1] | —[1] | 3 | 4.5 | 6.1[1] | 2.9 | 3.6 | 4.5 | 2.6 | 2.9 | 4.8 | 1.3 | 2.2 | 4.2 |
| Quick Stick to Kraft, pli | | 0.5 | 0.8 | 1.4[3] | 1.1 | 1.4 | 1[2] | 0.7 | 1[2] | 1[2] | 1 | 1.2[2] | 1[2] | 0.7 | 1[1] | 1 |

[1]Cohesive failure
[2]Split Kraft
[3]Jerky detachment

1. An adhesive composition which fails cohesively at ambient temperatures comprising as a minimum a block copolymer component and a tackifying resin component, wherein said block copolymer component is prepared by the process comprising:
   (a) reacting an organomonolithium compound with a monoalkenyl arene in the presence of an inert diluent, said organomonolithium compound having the structure RLi where R contains from 2 to 20 carbon atoms per molecule and is an aliphatic radical, cycloaliphatic radical, aromatic radical, or combination thereof;
   (b) reacting the product mixture from step (a) with a conjugated diene having 4 to 5 carbon atoms per molecule; and
   (c) reacting the product mixture from step (b) with a coupling agent in such an amount and under such conditions as to vary the coupling efficiency of the process within the range of about 20% to about 80% therein controlling the cohesive strength of the adhesive composition.

2. A composition according to claim 1 wherein said monoalkenyl arene is styrene and said conjugated diene is selected from the group consisting of isoprene and butadiene.

3. A composition according to claim 2 wherein said diene is isoprene and said coupling efficiency is about 50%.

4. A composition according to claim 1 wherein said adhesive composition comprises said block copolymer, said tackifying resin, and a rubber extending oil.

5. A composition according to claim 4 wherein said monoalkenyl arene is styrene, said conjugated diene is isoprene, and said coupling efficiency is about 67.5%.

6. A composition according to claim 2 wherein said organomonolithium compound is sec-butyl lithium.

7. A composition according to claim 6 wherein said coupling agent is selected from polyhalides.

8. A composition according to claim 6 wherein said coupling agent is dibromoethane.

9. A composition according to claim 1 wherein the coupling efficiency varies from about 30% to about 70%.

10. An adhesive composition comprising a block copolymer component and a tackifying resin component, wherein said block copolymer is recovered from the process comprising:
    (a) reacting an organomonolithium compound with a monoalkenyl arene in the presence of an inert diluent, said organomonolithium compound having the structure RLi where R contains from 2 to 20 carbon atoms per molecule and is an aliphatic radical, cycloaliphatic radical, aromatic radical, or combination thereof;
    (b) reacting the product mixture from step (a) with a conjugated diene having 4 to 5 carbon atoms per molecule; and
    (c) reacting the product mixture from step (b) with a coupling agent in such an amount and under such conditions as to vary the coupling efficiency of the process within the range of about 20% to about 80% therein controlling the cohesive strength of the adhesive composition.

11. An adhesive composition according to claim 10 wherein the adhesive composition also contains an extending oil.

12. An adhesive composition according to claim 10 wherein the adhesive composition also contains an extending oil, arene-block-compatible resin, and a stabilizer.

* * * * *